Patented Feb. 19, 1952

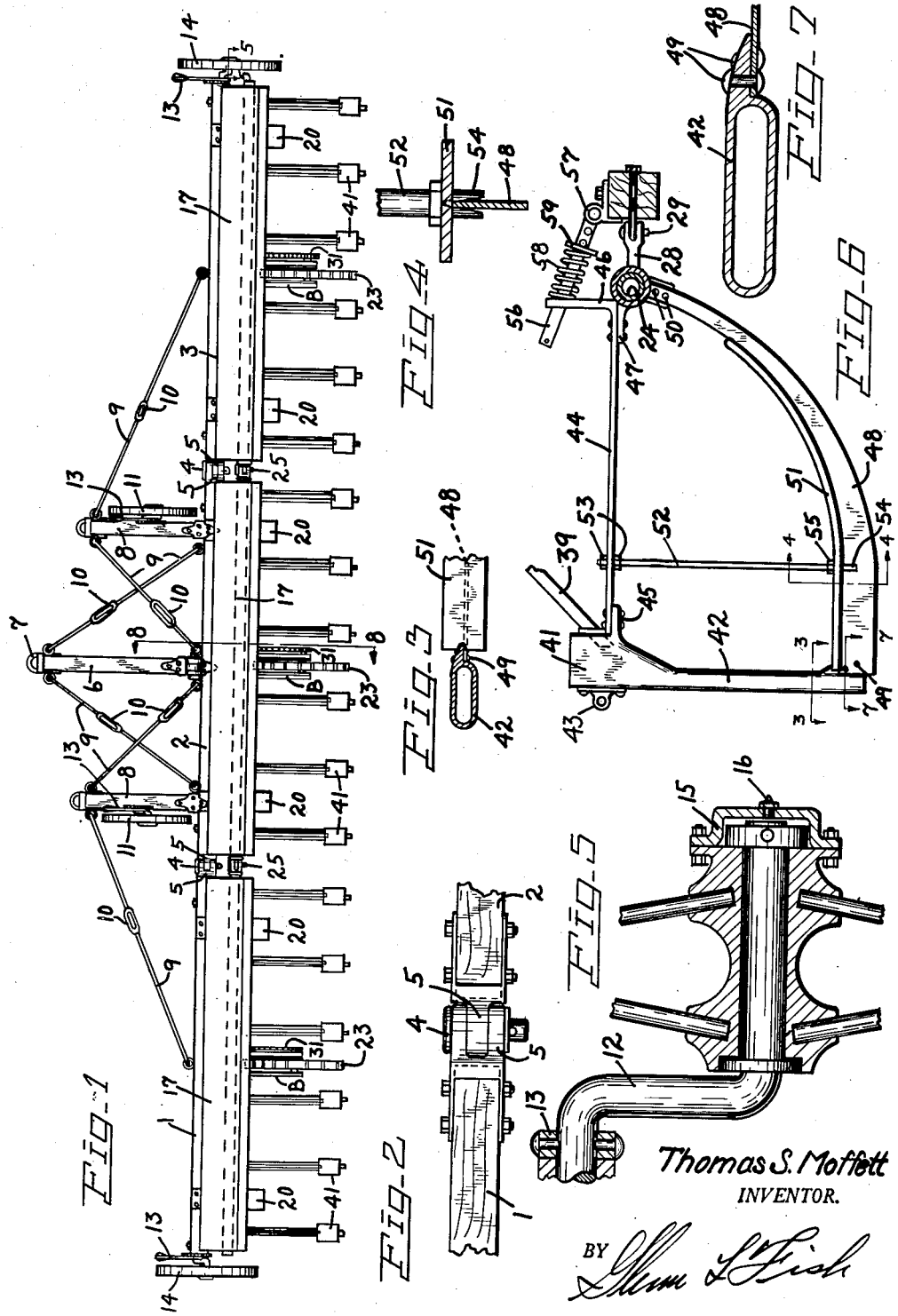

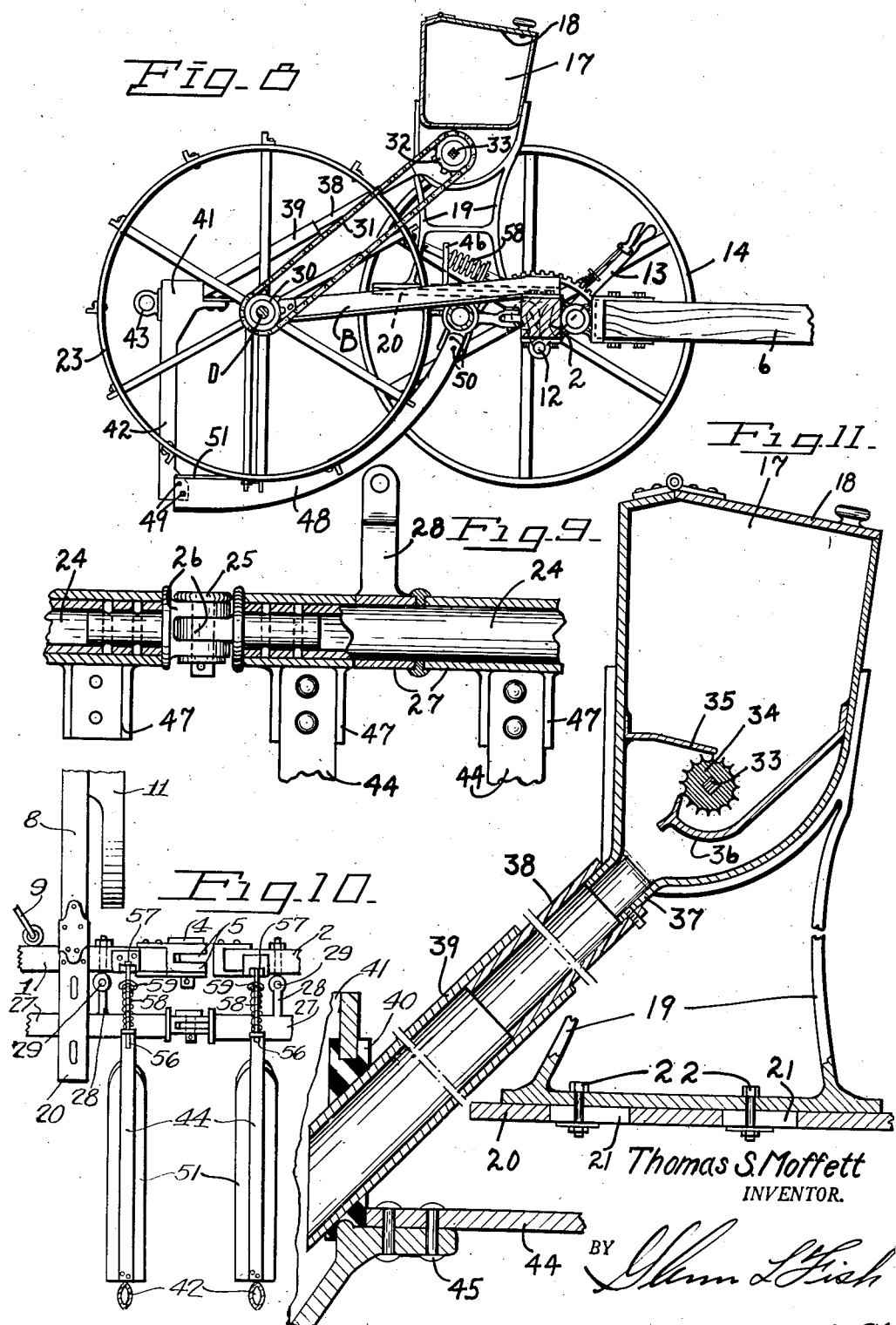

2,586,246

UNITED STATES PATENT OFFICE 2,586,246

FLEXIBLE FRAME SEED DRILL

Thomas S. Moffett, Vancouver, Wash.

Application August 12, 1946, Serial No. 689,847

2 Claims. (Cl. 111—55)

The present invention relates generally to seed planting or drilling implements, and more specifically to improvements in flexible frame seed drill of the hill-planting, wheeled machine type having a flexible main frame carrying feed-hopper units, with wheel-drives for the units, together with a flexible drag frame including multiple furrow openers and seed depositing mechanisms.

The primary object of the invention is the provision of a drill having longitudinal and lateral articulated joints, which may be horse drawn or towed by a tractor, and adapted to conform to irregularities in the ground surface for efficient and effective operations over a comparatively wide planting area of the field.

The invention consists in certain novel combinations and arrangements of parts as will hereinafter be described and more specifically set forth in the appended claims.

In the accompanying drawings I have illustrated one complete and satisfactory example of the physical embodiment of my invention in which the parts are combined and arranged in accord with one mode I have devised for the practical application of the principles of my invention.

It will be understood that various changes and alterations are contemplated and may be made in these exemplifying drawings and mechanical structures; the number of interchangeable sections and units may be varied in adapting the implement to different conditions; and other changes may be made within the scope of my claims without departing from the principles of my invention.

Figure 1 is a plan view of a flexible frame seed drill.

Figure 2 is an enlarged detail view showing a flexible joint between sections of the main transversely extending draft beam of the main frame of the implement.

Figure 3 is a horizontal detail sectional view at line 3—3 of Fig. 6.

Figure 4 is an enlarged vertical sectional view at line 4—4 of Fig. 6 disclosing a portion of a furrow opener and its guard plate or runner.

Figure 5 is an enlarged detail sectional view of one of the supporting wheel-hubs with its crank axle, as at line 5—5 of Fig. 1.

Figure 6 is an enlarged detail view in elevation of a seed depositing and planting unit including a furrow opener and seed-depositing chute, and showing in transverse section the coupling bar of the drag frame and the coupling between the drag frame and the main wheeled frame, together with holding means for the drag frame.

Figure 7 is an enlarged detail horizontal sectional view at line 7—7 of Fig. 6 disclosing a seed chute or spout and furrow opener.

Figure 8 is a transverse vertical sectional view at line 8—8 of Fig. 1, omitting one of the front supporting wheels.

Figure 9 is an enlarged fragmentary view in horizontal section showing a joint between sections of the transverse coupling bar of the drag frame.

Figure 10 is an enlarged fragmentary detail view in plan of a connection between the draft beam and coupling bar.

Figure 11 is an enlarged fragmentary detail vertical sectional view.

In this preferred embodiment of my invention I employ in the main frame a transversely extending draft beam made up of three sections or bars 1, 2, and 3, that are flexibly jointed or hinged together on horizontal pins or bolts 4, passing through perforated ears 5, 5 of the adjoining ends of the sections.

The intermediate section or bar 2 is provided with a central pivoted draft tongue 6 having a front hitching eye or loop 7, and in addition a pair of laterally arranged hitching tongues 8, 8, are pivoted on the intermediate section 2. These tongues are braced for stability by a system of rods or bars 9 having turn-buckles 10. Front supporting wheels 11 are journaled on crank axles 12 mounted on the tongues 8; and a rack and detent lever 13 is employed with each of the crank axles to adjust the position of each wheel 11. Similar crank axles and levers are associated with wheels 14 supporting the ends of the draft beam. For protection, all of the supporting wheels are provided with dust-proof hub-caps 15 and lubricating means 16, as shown in Fig. 5.

Each of the three sections of the main frame supports a feed hopper 17, having a top lid 18, and each hopper is mounted on two open upright frames 19, 19, adjustably mounted on spaced longitudinally extending base plates 20 that are bolted at their front ends to the sections of the transverse draft beam.

In Fig. 10 it will be seen that the base plates are slotted at 21, and bolts 22 are employed with the base plates and hopper frames for fixing the hopper in adjusted position to take up slack or tighten the chain drives for the feeding mechanism within the hoppers, as will be described.

The three seed feeding mechanisms within the hoppers are each operated by a drive wheel 23 journaled on a short drive shaft D which is mounted in bearings on a longitudinally extending angle-iron bar B that is bolted at its front end on a section of the draft beam, 1, 2, or 3, to form part of the main frame of the implement.

The driving or power transmission mechanism from the driving wheels to the interior of the hoppers 17 will later be described.

The multi-unit seed-depositing mechanisms are coupled at the rear of the draft beams by means of a drag frame comprising a transversely extending sectional coupling bar 24 with the adjoining ends of the sections coupled together by pins or bolts 25 passing through ears 26, as seen in Fig. 9, and this sectional coupling bar is enclosed in a tubular concentric housing 27. The housing is equipped with a number of laterally spaced forwardly projecting coupling lugs 28, and bolts or pins 29 loosely couple these lugs to the sections of the draft beam, as seen in Fig. 6.

Each driving wheel 23 is equipped with a driving sprocket 30, and a driving sprocket chain 31 extends forwardly and upwardly to, and passes around, a driven sprocket wheel 32 mounted in a recess exterior of the bottom of the hopper on a square shaft 33 that is journaled in the opposite ends of the hopper and extends therethrough from end to end. The drive chains may be correctly set by adjusting the hoppers as indicated in Fig. 10.

Within the hopper a toothed feed drum 34 is mounted to revolve with the shaft 33, and the drum is located between an upper feed plate 35 disposed horizontally and attached to the back or rear wall of the hopper, and a lower concave longitudinally extending bed 36. The feed plate and the bed form a discharge mouth near the bottom of the hopper for passage of seeds to a series of spaced discharge nipples 37 projecting downwardly and rearwardly of the hopper bottom.

A seed feeding pipe or tube 38 is attached at its upper end to each nipple, and the lower end of the pipe telescopes within a nozzle 39 that is mounted in a flexible fixture or diaphragm 40, of rubber or other suitable material, that is mounted in a wall of an open head 41 of a seed-depositing spout or chute 42. Six or more of these tubular chutes are provided for each of the three hoppers, and they are spaced to conform to the planting rows of the field.

In Figs. 6, 8, and 10, it will be seen that each of the depositing chutes is provided with a ring 43, at its rear edge for the reception of a rod or bar (not shown).

When the rod or bar is mounted in the rings or lugs 43 it passes through spaces between the spokes of wheels 23, and the drill units which normally form a drag-frame, are thus connected or jointed together so that they may be elevated for transportation of the implement to and from a field.

The vertically arranged depositing chutes or spouts with their boxes or hollow heads 41, are supported from the housing 27 of the coupling bar by means of upper horizontal tie bars 44, each of which bars is bolted at 45 to a chute, and at its front end the tie bar is formed with an upstanding angle bracket 46 which is bolted or riveted to a rear bracket arm 47 of the housing.

Each seed depositing mechanism is provided with a furrow opener or flat vertically disposed blade 48 which is riveted at 49 at the lower end in front of the seeding chute 42 and the upper end of the curved blade is riveted at 50 to a bracket or other part rigid with the housing 27 of the coupling bar to form a seed-depositing and planting unit.

To support the drag frame and prevent the furrow openers from sinking too deeply into the soil, a flat guard runner or rail 51, which conforms to the curved shape of the furrow opener, is mounted on the upper edge of the blade; and a vertically arranged tie-bolt 52 is locked by nuts 53 on the tie-plate 44. The lower end 54 of the tie bolt is forked and it passes through a hole in the guard plate or rail to straddle the blade 48, to which it is locked by nut 55.

Each of the seed-depositing and planting units is provided with separate resilient means, as seen in Fig. 6, for holding it to its work in connection with the couplings 28, 29. For this purpose, a bolt 56 is pivoted above the coupling 57 to a bracket on a draft bar section 1, 2, or 3, and the rear end of the bolt passes through a hole in the angle bracket 46 of the tie plate 44. A spring 58 is coiled about the bolt and interposed between a fixed collar 59 on the bolt and the bracket 46, and it will be obvious that these holding-down devices, through the action of the springs, will maintain the seed depositing and planting units in proper position for the performance of their functions.

Having thus fully described my invention, what I claim as new and desire to secure by Letters Patent is:

1. In a flexible frame seed drill, the combination of a wheel-supported articulated transverse draft beam comprising a plurality of transversely extending sections jointed at their adjacent ends, a plurality of seed hoppers transversely arranged and having seed feed means adapted to be driven, a driving wheel and operative driving connections for each hopper, each hopper and its driving wheel being secured to an associated section of the draft beam, an articulated transverse drag frame comprising a transversely extending coupling bar disposed rearwardly of the draft beam and made up of sections similar in number to the sections of the draft beam and correspondingly jointed so as to articulate therewith, means loosely connecting the sections of the draft beam and coupling bar together, seed-depositing and planting units mounted on the sections of said coupling bar, means to convey seed fed from the hoppers to the units, and means reacting between each section of said draft beam and its corresponding section of said coupling bar for urging said units down into operative planting position.

2. The combination as defined in claim 1, in which the last-named means comprise resilient means.

THOMAS S. MOFFETT.

REFERENCES CITED

The following references are of record in the file of this patent:

UNITED STATES PATENTS

| Number | Name | Date |
|---|---|---|
| 284,060 | Randall | Aug. 28, 1883 |
| 299,405 | Kulp | May 27, 1884 |
| 309,706 | Gale | Dec. 23, 1884 |
| 347,863 | Beebe | Aug. 24, 1886 |
| 409,238 | Ritty | Aug. 20, 1889 |
| 513,060 | Schopp et al. | Jan. 16, 1894 |
| 575,863 | Studebaker | Jan. 26, 1897 |
| 744,375 | Lussier | Nov. 17, 1903 |
| 1,052,459 | Carr | Feb. 11, 1913 |
| 1,057,985 | Starr | Apr. 1, 1913 |
| 1,090,167 | Owens | Mar. 17, 1914 |
| 1,314,863 | Fetzer | Sept. 2, 1919 |
| 1,333,391 | Dodd | Mar. 9, 1920 |
| 1,617,967 | Schrag | Feb. 15, 1927 |
| 1,754,497 | Boucher | Apr. 15, 1930 |
| 1,927,458 | Klise | Sept. 19, 1933 |
| 1,938,132 | Broemmelsick et al. | Dec. 5, 1933 |